(12) United States Patent
Jones

(10) Patent No.: US 7,040,556 B2
(45) Date of Patent: May 9, 2006

(54) CONVERTIBLE BROADCAST SPREADER

(76) Inventor: Michael T Jones, 10531 E. Riverview Dr., Bloomington, MN (US) 55347

( * ) Notice: Subject to any disclaimer, the term of this patent is extended or adjusted under 35 U.S.C. 154(b) by 28 days.

(21) Appl. No.: 10/939,447

(22) Filed: Sep. 14, 2004

(65) Prior Publication Data

US 2006/0054722 A1    Mar. 16, 2006

(51) Int. Cl.
*A01C 15/00* (2006.01)
(52) U.S. Cl. .................. 239/663; 239/681; 239/685; 239/289; 222/610
(58) Field of Classification Search ............... 239/663, 239/289, 685, 681, 684, 686; 222/610, 613, 222/614, 623
See application file for complete search history.

(56) References Cited

U.S. PATENT DOCUMENTS 3,523,648 A * 8/1970 Garber ..................... 239/668
4,548,362 A * 10/1985 Doering ..................... 239/685

* cited by examiner

*Primary Examiner*—Dinh Q. Nguyen
(74) *Attorney, Agent, or Firm*—Herman H Bains

(57) ABSTRACT

A broadcast type fertilizer spreader includes a hopper having ground engaging wheels mounted on the hopper frame and operating the broadcast rotor which broadcast the fertilizer. The spreader includes a handle for guiding and pushing the spreader and an actuator handle for opening and closing the dispensing openings in the hopper. A tow bar is readily connectable to the spreader and a tractor to convert the spreader to a towable mode.

7 Claims, 2 Drawing Sheets

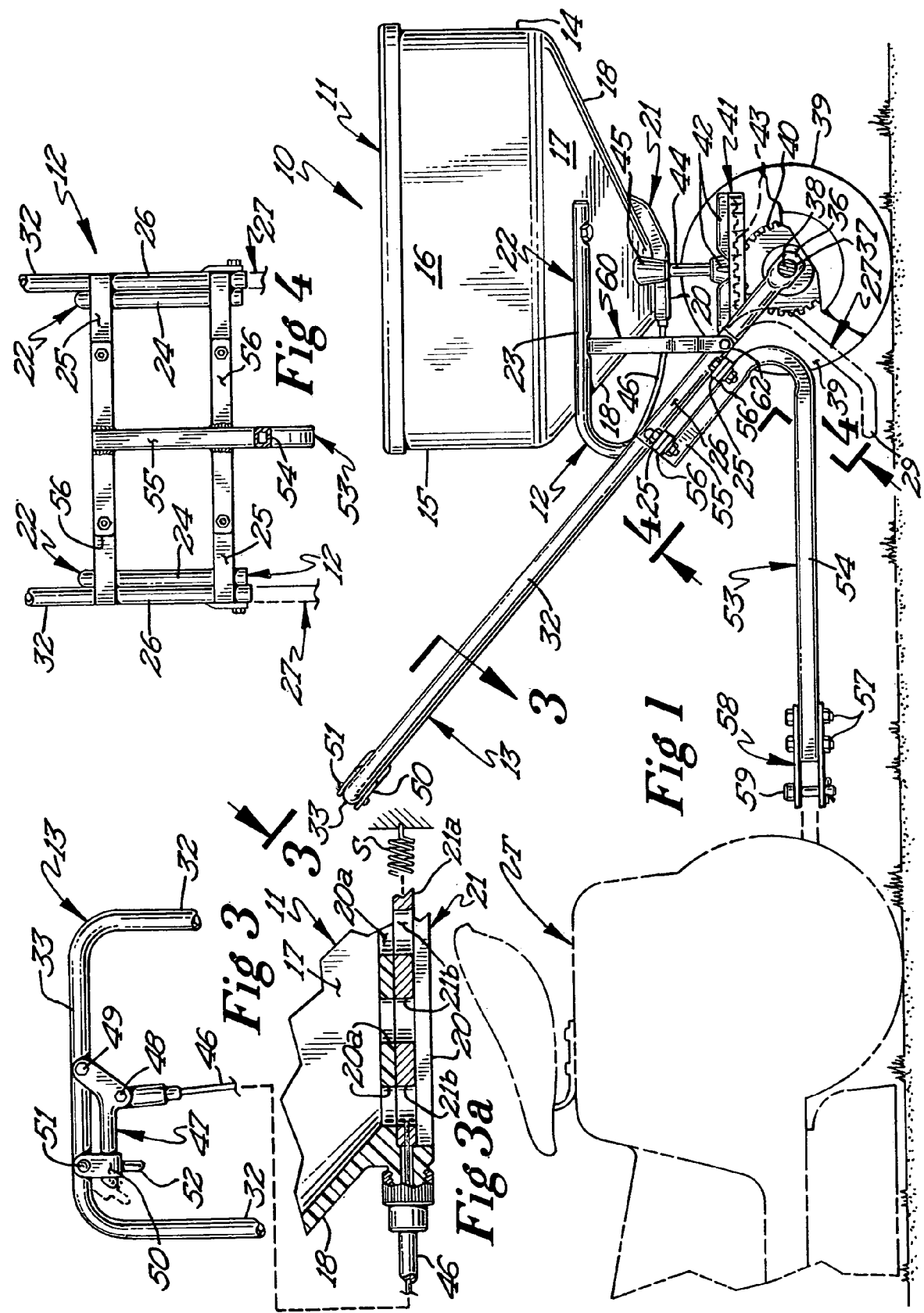

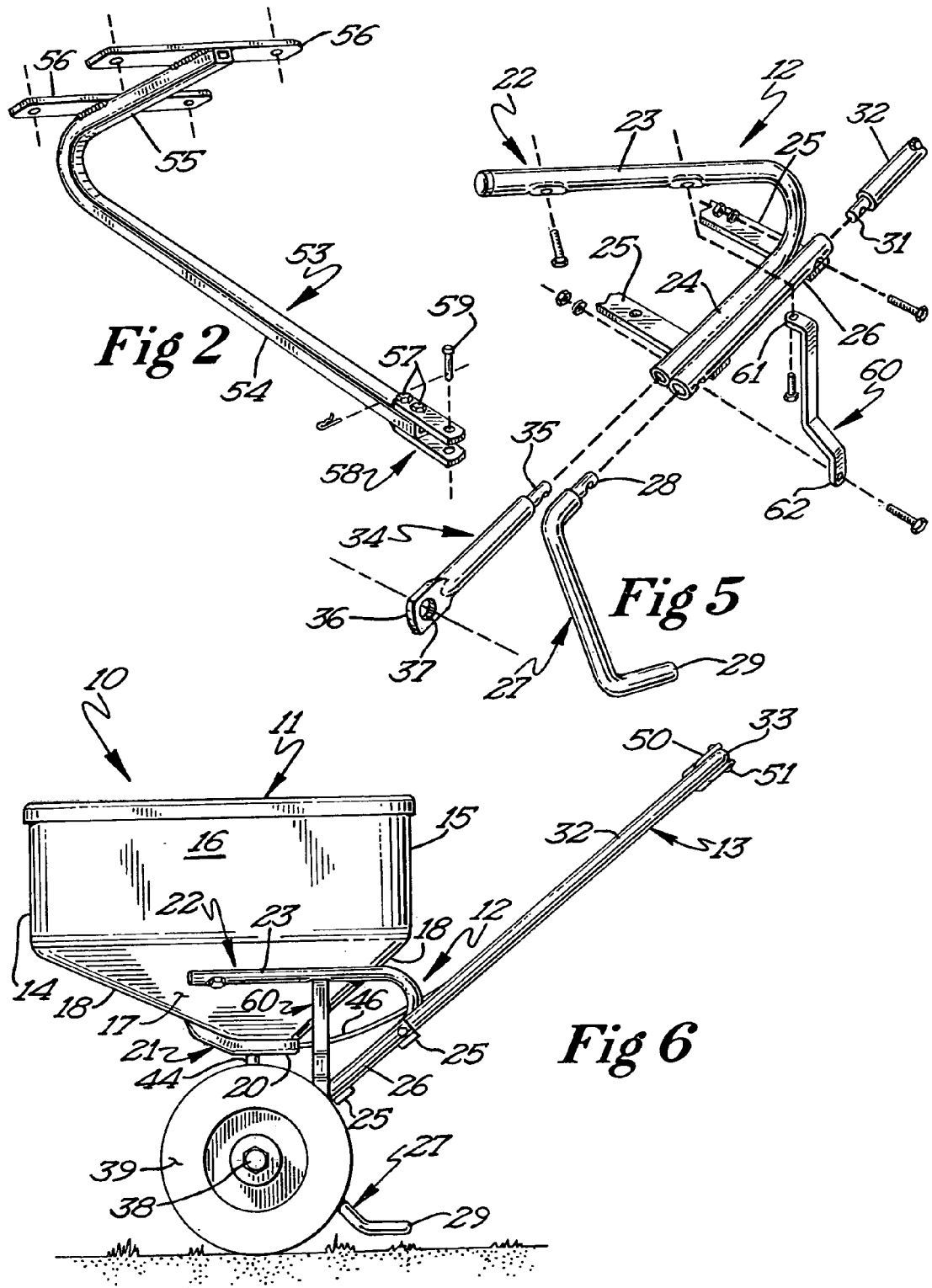

US 7,040,556 B2

CONVERTIBLE BROADCAST SPREADER

FIELD OF THE INVENTION

This invention relates to a conventional operator guided and propelled fertilizer spreader which may be readily converted to a tow type spreader attachable to a garden tractor.

BACKGROUND OF THE INVENTION

Conventional fertilizer and herbicide spreaders are extensively used by residential owners for lawn care. The spreaders are operator guided and propelled and one popular kind of spreader is the broadcast spreader. Many residential owners now own garden tractors or riding mowers which, in addition to mowing, are used to tow small towable vehicles. In the present invention, a conventional broadcast type spreader is provided with a tow bar assembly which enables the spreader to be attached to a small utility or garden tractor or to be used in the conventionally operator guided mode.

SUMMARY OF THE INVENTION

An object of this invention is to provide a fertilizer spreader with a readily attachable and detachable tow bar assembly for attachment to a tractor to enable the spreader to be used in an operator propelled mode or a towable mode.

The broadcast spreader includes a hopper supported by ground-engaging wheels and a handle for guiding and propelling the spreader. The hopper is provided with openings and a valve plate for controlling the amount of fertilizer discharged. A vaned rotor plate positioned below the hopper and driven by an axle mounted gear broadcasts the fertilizer in a conventional manner.

A tow bar is provided and is releasably attached to the spreader and a tractor when the spreader is used a towable mode. The valve plate is controlled by a cable having an actuator on the spreader handle. A keeper is mounted on the spreader handle and enables the actuator to be selectively held in the open position such that the valve plate actuator is not required to be manipulated when the spreader is being towed.

BRIED DESCRIPTION OF THE FIGURES OF THE DRAWINGS

FIG. 1 is a side elevational view of the convertible broadcast spreader in the towable mode;

FIG. 2 is a perspective view of the tow bar assembly;

FIG. 3 is a front elevational view of the spreader handle taken approximately along line 3—3 of FIG. 1 and looking in the direction of the arrows;

FIG. 3a is an enlarged fragmentary cross-sectional view of a portion of the hopper showing the valve plate for opening and closing the hopper openings;

FIG. 4 is a rear elevational view of a portion of the handle and tow bar taken along line 4—4 and looking in the direction of the arrows;

FIG. 5 is an exploded perspective view of a portion of the frame for the spreader illustrating details of construction thereof, and FIG. 6 is a side elevational view of the spreader in the operator propelled mode.

DESCRIPTION OF THE PREFERRED EMBODIMENT

Referring now to the drawings and more particularly to FIG. 1, it will be seen that one embodiment of the convertible broadcast spreader, designated generally by the reference numeral 10, is there shown. The spreader includes an open top hopper 11 mounted on a frame assembly 12 and having a handle 13.

The hopper 11 is made of a rigid material, preferrably plastic, and includes a vertical front wall 14, a rear wall 15 and opposed side walls 16. Downwardly and inwardly side wall portions 17 are integral with a downwardly and rearwardly front wall portion 18 and a downwardly and forwardly extending rear wall portion 19. The wall portions terminate in a substantially flat lower wall portion 20 having transversely spaced apart openings 20a therein through which granular fertilizer is dispensed.

The hopper 11 is mounted on the frame assembly 12 which includes a pair of hopper mounting brackets 22, each of which is comprised a bent pipe including a forwardly projecting hopper engaging portion 23 and a downwardly and forwardly extending lower portion 24. The hopper engaging portion 23 of each bracket 22 is secured to a converging side wall portions 17 of the hopper 11 by secured bolt and nut assemblies. One of a pair of elongate, substantially straight mounting sleeves 26 is welded to the lower portion 24 of a hopper mounting bracket 22. It will be noted that the mounting sleeves 26 each have a length dimension corresponding to the length dimension of the lower portion 24 of bracket 22. A pair of elongate, substantially flat cross bars 25 extend between and rigidly interconnect the lower portion 24 and mounting sleeve 26 of each bracket 22 together.

A pair of U-shaped leg or foot members 27 are provided to support the spreader 10 in a rest position. Each leg includes an apertured reduced upper end portion 28 which telescopes into and is attached to one of the mounting sleeves 26 by a suitable bolt and nut assembly. The lower portion 29 of each leg extends almost horizontally and is adapted to the engage the ground surface.

A pair of elongate vertically disposed braces 60 are each connected to the hopper engaging portion 23 of a bracket 22 by a bolt which also engages the hopper. The upper end of the brace is bent at right angles to the body of the brace and the lower vertical end portion 62 is secured one of the mounting sleeves 26. The U-shaped handle 13 also includes a transverse portion 33 which is interval with a pair of longitudinal members 32. Referring again to FIG. 5, it will be seen that the lower ends 31 of each of the longitudinal members 32 are reduced in size and telescope into an open end of the mounting sleeve 26 and are secured thereto by suitable bolt and nut assemblies.

A pair of elongate axle mounting members 34 each have a reduced end 35 which is telescoped into an end of the lower portion 24 of bracket 22 and secured thereto by a nut and bolt assembly. The other end of each axle mounting member 34 is flattened and this flattened end 36 has an opening 37 therein for receiving a wheel axle 38 there through.

A pair of ground engaging wheels 39 are secured to the axle 38 and a drive gear 40 is mounted on the axle for rotation therewith. A horizontally disposed broadcast rotor plate is secured to a vertical shaft 44 having its upper end journaled in a bearing 45. In the embodiment 41 shown, the bearing 45 is a molded in feature of the hopper. The rotor plate 41 is provided with a plurality of radially arranged distributor vanes on the upper surface thereof. A driven gear 43 is secured to the rotor plate 41 and is disposed in meshing relation with the drive gear 40. When the spreader is moved along the ground surface the wheels 39 will drive the vaned rotor and broadcast fertilizer falling upon the rotor plate.

One end of an elongate actuator cable 46 is connected to the dispensing valve plate 21b which adjusts the dispensing openings in the lower portion of the hopper. This cable operated valve is well known in broadcast spreaders. In this regard, the valve plate has a plurality of openings 21b therein which correspond in size to the openings in the hopper. When the openings 21b in the valve plate are in registering relation with the openings with the hopper openings, the valve plate is in the open position. A spring S urges the valve plate to the closed position. The other end of the cable 46 is connected to an actuator handle 47 by a pivot 48. The actuator handle 47 pivotally mounted on the transverse portion of the handle by a pivot 49. The cable 46 is normally urged to a closed position by the spring S. The handle 47 is pulled to open the valve plate and when the handle is released the cable and valve plate will be urged to the closed position.

Much of the structure described is well known in the broadcast spreader art. A U-shaped keeper 50 is pivotally mounted on the transverse portion 33 of the handle by a pivot 51. An actuator element 52 is secured to the bight portion of the keeper 50 to facilitate pivoting movement of the keeper. The keeper 50 is pivotal between a locked-open position, as shown in full line configuration in FIG. 3, and a release position, as shown in phantom line configuration. The keeper 50 serves to keep the valve plate open when the spreader is on the towable mode.

One of the novel features of this invention is to adapt the push type broadcast spreader for towing by a small garden type tractor. Referring now to FIG. 1, it will be seen that a tow bar assembly 53 interconnects the spreader 10 to a tractor T. The tow bar assembly 53 includes tow bar 54 an attachment portion 55. The tow bar assembly is arcuately bent to define the tow bar 54 and attachment portion as shown in FIG. 2.

The attachment portion 55 is provided with a pair of spaced apart transversely extending attachment bars 56 each having openings in the end portions thereof. The spacing between the bars 56 corresponds to the spacing between bars 25 of the frame assembly 12. Each bar 56 is disposed in engaging relation with a bar 25 and is secured thereto by bolt and nut assemblies thereby securing the tow bar assembly to the spreader.

The free end of the tow bar 54 is provided with a clevis hitch 58 for engaging the mating hitch on a tractor hitch bar by a hitch pin 59. The hitch pin connection allows articulated movement of the spreader as it is being towed.

The spreader 10 may be used in the conventional user propelled manner by a user who pushes the spreader. The actuator handle is pulled and held in the valve plate open position as the spreader is pushed thereby allowing the fertilizer to be broadcast.

If the spreader is to be towed, the tow bar assembly may be readily attached to the spreader by securing the attachment bars 56 of the tow bar assembly to the cross bars 25 of the frame assembly. This unique design of the frame assembly allows ready attachment and detachment of the tow bar assembly to the spreader.

After the tow bar assembly is attached to the spreader and tractor T, the keeper 50 is pivoted to retain the actuator handle in the open position. The operator may then tow the spreader with the tractor T. It will be seen that the spreader is towed in a reverse rather than forward direction. However, the broadcast effect will be substantially identical to the effect provided when the spreader is pushed in a forward direction.

From the foregoing description, it will be seen that a conventional broadcast type spreader is readily convertible via a novel tow bar assembly for towing by a small tractor.

What is claimed is:

1. A broadcast type fertilizer spreader being readily convertible between an operator guided and propelled mode and a towable mode for towing by a tractor, comprising
a hopper having outlet openings through which fertilizer is dispensed, means for opening and closing said openings,
a rotatable broadcast rotor mounted on the hopper and positioned below the outlet openings,
ground engaging wheels having a wheel axle journaled on a frame, drive means on a axle drivingly connected to the rotor for rotating the rotor,
a handle connected to the frame for guiding and propelling the spreader, actuating means mounted on the handle and connected to the means for opening and closing the openings in the hopper,
an elongate tow bar having hitch means at one end thereof for connection to a tractor, an attachment portion at the other end of said tow bar and being integral therewith; said attachment portion being readily attachable to the frame of the spreader to enable towing of the spreader by a tractor with the handle of the spreader pointing towards and adjacent the tractor.

2. The spreader as defined in claim 1 wherein said attachment portion of the tow bar is angularly disposed with respect to the tow bar.

3. The spreader as defined in claim 2 wherein said frame includes a pair of laterally spaced apart substantially identical hopper mounting brackets each including a hopper engaging portion secured to a side of the hopper and each bracket including a lower portion integral with a hopper engaging portion and extending angularly downwardly therefrom, said attachment portion of the tow bar including means for engagement and connection with the lower portions of said brackets.

4. The spreader as defined in claim 3 and a pair of spaced apart cross bars rigidly interconnecting the lower portions of the brackets together, said engaging means for the attachment portion of the tow bar including a pair of spaced apart bars for matingly engaging the cross bars for the brackets and for connection thereto.

5. The spreader as defined in claim 1 wherein the actuating means includes an actuator handle pivotally mounted on the spreader handle for pivotal movement between an open and closed positions, an actuator cable connected to the actuator handle and connected to the means for opening and closing the openings in the hopper, said actuator handle when in the open position opening the openings in the hopper to allow fertilizer to be dispensed there through, means urging the actuator handle to the closed position, and a keeper pivotally mounted on the spreader handle for pivotal movement between release and retained positions, said keeper when in the retained position retaining the actuator handle in the open position.

6. The spreader as defined in claim 5 wherein said keeper is of U-shaped configuration.

7. The spreader as defined in claim 2 wherein said attachment portion of the tow bar extends upwardly from the tow bar.

* * * * *